United States Patent Office 3,572,116
Patented Mar. 23, 1971

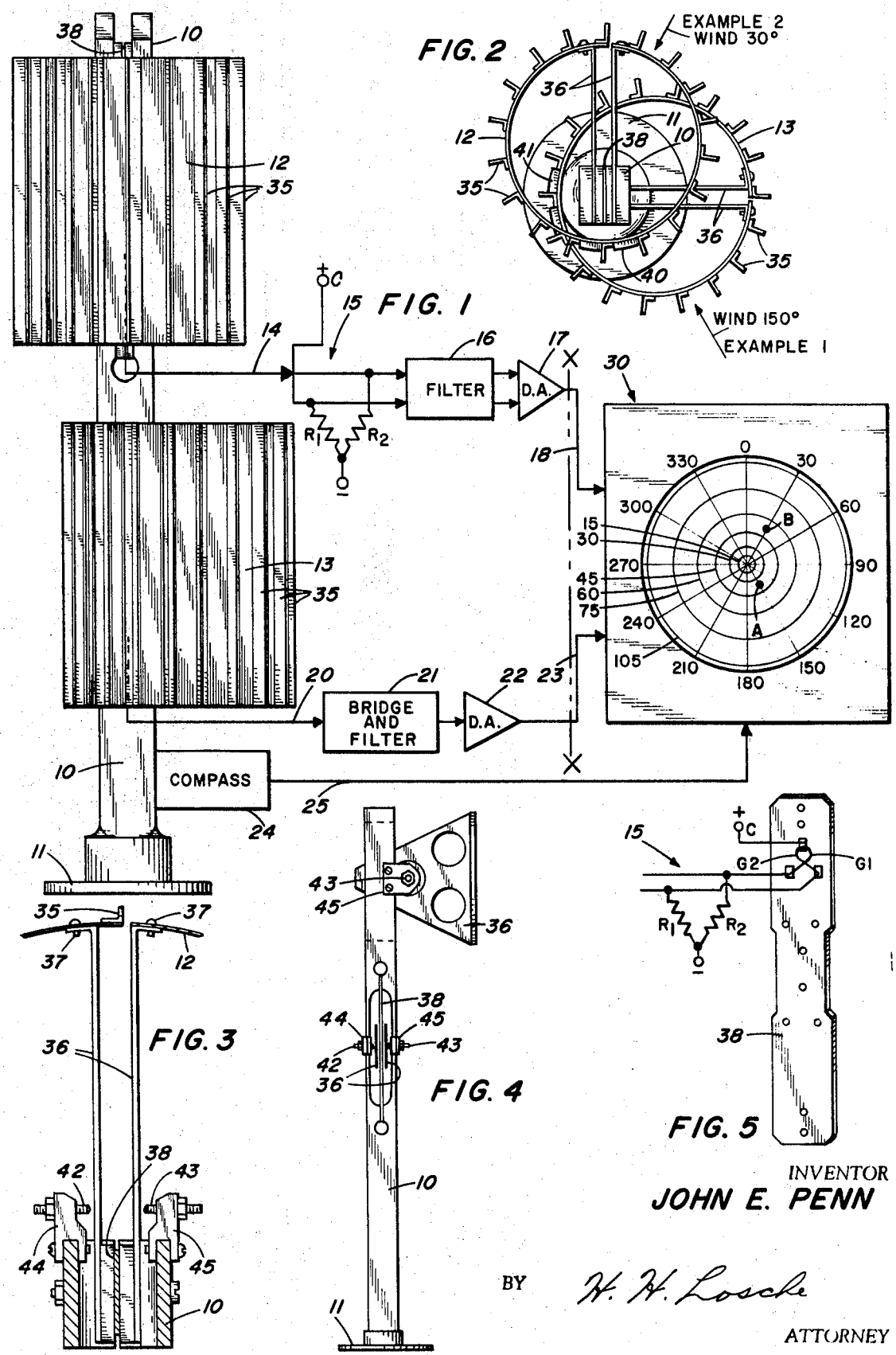

3,572,116
SEMICONDUCTOR WIND SPEED AND DIRECTION SENSOR
John E. Penn, 5441 E. 16th St., Indianapolis, Ind. 46218
Filed Oct. 24, 1969, Ser. No. 869,033
Int. Cl. G01w 1/02
U.S. Cl. 73—189
7 Claims

ABSTRACT OF THE DISCLOSURE

A semiconductor wind speed and direction sensor having two cylindrical wind drag units eccentrically supported on torque responsive strips, each with the diameter in alignment with the eccentricity and being normal or at 90° to each other and with silicon semiconductor strain gages mounted on the torque responsive material strips to sense and produce electric signals representative of drag unit torque movement in response to and proportional to the wind direction and the square of wind velocity.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Prior known wind sensing devices are preponderantly of the anemometer rotating cup or rotating propeller types which have relatively rotating parts that require precision fit and lubrication maintenance throughout the time of use. These devices experience difficulty in operating uniformly over extended periods and particularly in oceanic and frozen north environments where corrosion from salt water and frost disables or reduces wind calibration. Some static anemometers are known which suspend a sphere on a balanced arm and any movement of the arm due to wind forces is electrically measured to obtain wind velocity. Two such suspended spheres in a 90° relation will provide wind direction. Conventional wire strain gages are used with these latter devices to transduce mechanical motion to electrical terms.

SUMMARY OF THE INVENTION

In the present invention two cylindrical units having wind drag surfaces therearound externally are eccentrically supported on torque responsive spring strips with the cylinder eccentricity 90° apart. The torque responsive spring strips are mounted on an upright standard, one above the other, each having a pair of semiconductor strain gages, such as silicon, thereon. The strain gages are coupled through a bridge and filter network to readout circuits where the wind direction and speed are calibrated from the wind forces on the two cylindrical units. The cylindrical units are each counterbalanced on the eccentric axis to nullify any sensing of bending moments that produce torques in the strips, due to inertia effects when the sensor is mounted on tilted or oscillating base supports, such as weather buoys, etc. It is accordingly an object of this invention to provide a wind direction and speed sensor that is static with no relative moving journaled parts to cause variable friction and which would withstand oceanic and frigid weather conditions without failure.

BRIEF DESCRIPTION OF THE DRAWING

These and other objects and the attendant advantages, features, and uses of the invention will become more apparent to those skilled in the art as a more detailed description proceeds when considered in conjunction with the accompanying drawing in which:

FIG. 1 is a partially schematic and partially elevational view of the mechanism and circuitry illustrating the invention;

FIG. 2 is a partially cross-sectional view and end elevational view looking downward on the wind sensor unit of FIG. 1;

FIG. 3 is a partially enlarged cross-sectional and partially elevational view of a portion of the support bracket and cylindrical wind vane member;

FIG. 4 is a side elevational view of the support standard for the wind sensor elements; and FIG. 5 is a face view and partially circuit schematic of the torque responsive support elements and strain gages.

DESCRIPTION OF THE PREFERRED EMBODIMENT

Referring more particularly to FIG. 1, with occasional reference to FIG. 2, a wind sensor device is supported on a standard or support member 10 with a flanged foot 11 for bolting or otherwise affixing to a platform to support the wind sensor elements 12 and 13 thereon. The wind sensor elements 12 and 13 are supported on the standard 10 in an eccentric manner as more specifically shown in FIG. 2, each sensor element 12 and 13 having strain gages coupled therein, as will later be more fully decsribed. The upper wind sensing element 12 has a strain gage output 14 consisting of a multiple conductor to a bridge circuit 15 which includes the strain pages G1 and G2 within the wind sensor element 12. The strain gage G1 is related in the bridge by a fixed reference resistor R1 while the strain gage element G2 in the wind sensor element 12 is related to the fixed reference resistor R2. The common connection of the strain gages G1 and G2 is designated by the letter C coupled to one pole of a voltage source while the common connection of the reference resistors R1 and R2 is coupled to the other pole of the voltage source. The output of the bridge circuit 15 is through a filter circuit 16 to a differential amplifier 17. Filter circuit 16 filters out or dampens the oscillation frequency produced by wind oscillations of the wind sensing element 12 to produce a steady voltage signal from the two strain gages G1 and G2, the predominant voltage signal, positive or negative, coming out of the differential amplifier 17 on the output 18. In like manner the strain gage electrical output from the wind sensor element 13 is by way of the conductor cable 20 through the bridge and filter circuit 21 to the differential amplifier 22 producing the voltage signal on the output 23 of the polarity dependent on the direction of torque exerted on the wind sensing element 13. A magnetic compass 24 is affixed to the standard 10, or the platform supporting the standard 10, as desired, to produce an electrical output signal over the output conductor 25 giving the relative position of the wind sensing device where such a wind sensing device is on a movable surface such as a surface of water.

The three ouputs 18, 23, and 25 from the wind sensing device are applied to a cathode ray tube indicating device 30, the face of which is calibrated to show speed circles, herein shown as being the circles 15, 30, 45, etc., up to 105. These speeds may be calibrated in knots or miles per hour, as desired. The face of the cathode ray tube may be, and preferably is, divided off into radials, the radials herein being shown as 30, 60, 90, etc., throughout the 360° although smaller divisions of radials may be used, as desired. The output 18 from the differential amplifier 17 is coupled to the horizontal deflection circuit while the output 23 is coupled to the vertical deflection circuit although they could be coupled in the reverse and the compass output 25 would establish north for the cylinder 12. The output 25 from the magnetic compass is preferably coupled to a Selsyn system or other means to rotate the yoke of the cathode ray tube device, in a manner well understood in the art, to always orient the yoke to produce zero degrees on the cathode ray tube with respect to a north setting of the wind sensor elements 10 through 13 in its position in the wind regardless of its orientation.

Referring more particularly to FIG. 2, with occasional reference to FIGS. 3, 4, and 5, the wind sensor elements 12 and 13 are preferably cylindrical members having external fins, corrugations, or other roughened surface means, herein designated as fins 35. Each cylinder is supported by a bracket 36, more particularly shown in FIG. 3, consisting of a pair of metal parts in side-by-side relation having the outer ends flanged to attach to the cylinders by screws or other means 37. The inner ends of the plates of the bracket 36 are affixed to a torque responsive material, such as a spring metallic or non-metallic strip 38, shown in an enlarged view in FIG. 5, the outer ends of which are affixed in the standard 10 by any suitable means, as shown more particularly in FIG. 4. The bracket 36 is of triangular shape, as more particularly shown in FIG. 4, having the flanges on the long outer side attached to the cylindrical wind sensor element, such as 12, with the axis of the cylinder passing through the bracket 36 at some point between its attachment to the spring strip 38 placing each wind sensor element 12 and 13 in a supported eccentric position surrounding the bracket 36 and standard or support member 10. By this mounting the sensor elements 12 and 13 are in free unobstructed air throughout 360°. In order to balance the cylinders 12 and 13 in this eccentrically mounted manner, a counter balancing weight 40 is placed on the outer or the inner surface of the wind sensor cylindrical member 12 on the diameter of eccentricity and a weight 41 is placed on the outer or on the inner surface of the lower wind sensor cylindrical member 13 also on the diameter of eccentricity, the inner surface being preferable, to nullify the sensing of any bending moments that produce torques in the strips due to the inertia effects when the sensor is mounted on an unstable object. Despite these balance weights, the mass and dimensioned proportions are such that resonance frequency is under that of most ambient vibrations in buildings, etc., for fixed installations and above most vibrations encountered in sea states, such as buoy installations.

As more particularly shown in FIGS. 3 and 4, the rotation of the bracket 36 through its pivotal or neutral axis within the spring support member 38 is limited in angular movement in each direction by the adjustable limiting pins 42 and 43 threaded within the bracket members 44 and 45, respectively, screwed or otherwise affixed to the support member 10. These limit screws 42 and 43 are screw threaded through the brackets 44 and 45, respectively, to adjust the limiting distance which may be stabilized by the jam nuts on each of the screw members. In this manner each of the wind sensing elements on the bracket 36 is limited in its movement of torque on the torque responsive spring member 38 supporting the same to avoid any permanent distortion of the spring support member.

Referring more particularly to FIG. 5, the spring support members 38 each has affixed thereto on a surface between the mounting end in the support member 10 and the bracket member 36 two silicon strain gage members G1 and G2 set at 90° with respect to each other and at 45° of the torsion axis of the member 38. The strain gages G1 and G2 are placed on the same side of the spring strip 38 and at the same height on the member 38 in order to minimize differential heat transfer to the gages, thus minimizing temperature differential effects due to the sun or other extraneous heat sources. These strain gages are also "unbacked" or placed directly on the surface of the member 38 without any supporting backing material to minimize creep and thus provide the greatest precision of strain detection possible. The strain gage G1 is opposed in the bridge circuit by the reference resistor R1 while the strain gage G2 is set in opposition to the reference resistor R2. The common voltage supply input C is coupled to the junction point of the strain gages G1 and G2 on the spring support 38, as shown in FIG. 5. Whenever the wind sensing element, such as the element 12, is rotated about its neutral axis through the spring support 38, the strain gages G1 and G2 will change in resistance in a manner such that one will increase (tension) and the other will decrease (compression). Acting with the bridge reference resistors R1 and R2, this will produce a voltage signal across the bridge 15 output. This signal passes through the filter 16 to the differential amplifier 17 which produces an output voltage on 18. For example, looking at the wind sensor element 12, as seen in FIG. 2, a clockwise torque on the wind sensor 12 will produce a negative voltage output on the differential amplifier 17 over the conductor 18 to the cathode ray tube device 30 to cause the spot to trace to the left of center or along the 270° radial proportional to the square of the wind velocity. On the other hand, a torque on the wind sensor element 12 to rotate it counterclockwise, will produce a positive voltage on the output 18 to cause the spot to extend out the 90° radial proportional to the square of the wind velocity producing the torque. In a similar manner a clockwise rotation of element 13 will produce a positive signal on the output 23 from the differential amplifier 22 to force the spot of the cathode ray tube upward of center along the zero radial proportional to the square of the wind velocity producing the torque. A counterclockwise torque on element 13 will produce the opposite results.

OPERATION

In the operation of the wind sensing device let it be assumed that the wind sensor 10–13 is placed on the surface of the earth, whether it be water or land, in a direction as shown in FIG. 2 in which the diameter of eccentricity of element 12 is on a north line and the diameter of eccentricity of the element 13 is along the east direction line of the compass. An electrical pickoff of the magnetic compass in any well-known manner is transmitted by way of the output conductor 25 to the deflection yoke element of the cathode ray tube device 30 to rotate same to place zero preferably in the upward position normally considered North on the face of the tube. Let it now be considered for the purpose of Example 1, shown in FIG. 2, that wind direction is from a bearing of 150°. This wind direction will produce a counterclockwise torque on both wind sensing elements 12 and 13. In both instances the strain gages G1 and G2 for the wind-sensing elements 12 and 13 will be activated to produce signals through the bridge circuits and filter circuits to the differential amplifiers 17 and 22 to produce a negative voltage signal on the output 18 and a positive voltage signal on the output 23 to the horizontal and vertical deflection circuits, respectively, of the cathode ray tube device 30 to produce the spot A on the 150° radial of the cathode ray tube shown in FIG. 1 to be on about the 37 wind speed circle indicating the wind is blowing at 37 knots (or miles per hour) from the direction of 150°. Since the amplitude of the electrical signal is proportional to the square of the wind velocity, the wind speed circles 15 through 105 are spaced to reflect this proper proportion.

For Example 2, let it be assumed that the wind is from the direction of 30° which produces a counterclockwise torque on the the wind sensor element 12 and a clockwise torque on the wind sensor element 13. This condition produces a positive output voltage signal on the outputs 18 and 23 proportional to the torque to establish the spot B along the 30° radial of the cathode ray tube screen. The velocity of this wind is shown on the screen to be 52 knots (for example) indicating the wind velocity of 30° at 52 knots impinging upon the wind sensor elements 12 and 13. In like manner, whatever the wind direction, these strain gages will produce output signals operative through the bridge circuit, filter circuit, and differential amplifiers to produce voltage signals on the horizontal and vertical deflection coils of the cathode ray tube device 30 of an amplitude to establish a spot on the face of the tube indicating wind direction and speed. While the circuit in FIG. 1 illustrates a direct conductor connection between the wind sensor element and the cathode ray tube circuit, it is to be understood that the cathode ray tube indicator could be at some remote point and the three output signals over the conductors 22, 23, and 25 could be converted to ratio signals at the broken line X—X either by analog or digital means to be transmited and received at the remote station where the cathode ray tube indicator 30 is situated to indicated wind velocity in remote areas. It is also to be understood that other indicators than cathode ray tube indicators, such as 30 shown herein, may be used wherein this wind velocity and direction may be placed on a tape or other type recording means within the scope of those skilled in the art and as desired for the purpose intended. An alternate method utilizes a shaping network (approximate square root) to linearize the data before digitizing. The received telemetry (indigital form) can then be plotted on a nomograph, or otherwise processed to determined and record the actual wind speed and direction. It is also to be understood in view of the fact that the wind sensor elements 10 through 13 would normally be placed in areas where there would be temperature changes, the bridge circuit is constructed with temperature compensating resistors R1 and R2 or related temperature compensating circuitry in a manner well understood by those skilled in the art to provide proper signals although temperature changes are encountered.

While I have illustrated a preferred embodiment of my invention in the several views as described, it is to be understood that I am limited in the spirit of my invention only by the scope of the appended claims.

I claim:

1. A semiconductor wind direction and speed sensor comprising:
   a pair of cylindrical drag units, each having means affixed to its exterior cylindrical surface for reacting with said wind to move in response to wind direction and speed;
   a standard for supporting said pair of drag units;
   two torque responsive strips affixed to said standard in a spaced relation with the planar faces thereof at right angles with each other and with a neutral axis of each coincident with the axis of said standard;
   a supporting bracket affixed to each torque responsive strip at one end and affixed to the inner surface respectively of each cylindrical drag unit wherein each cylindrical drag unit encircles said standard, torque responsive strip, and supoprting bracket in an accentric manner with the diameter along the ecentricity of each unit being at right angles, said standard having limiting means thereon near the affixed point of each supporting bracket to said torque responsive strip to limit torque responsive strip movement;
   a pair of semiconductor strain gages mounted on each torque responsive strip on an area between said affixed portions to said standard and said supporting bracket with each strain gage pair symmetrically positioned with respect to each neutral axis for transducing mechanical torque movements into electrical signals; and
   electrical means coupled to said strain gages for converting said signals to wind direction and speed indication whereby the standard with the pair of cylindrical drag units thereon placed in the atmosphere will be rotated about the pivotal neutral axis in the torque responsive strips proportional to direction and speed of the wind forces for wind condition indications.

2. A semiconductor wind direction and speed sensor as set forth in claim 1 wherein
   said limiting means are screws adjustable relative to said standards each with a free end in spaced relation with said supporting bracket therebetween to adjustably limit the pivot of said supporting bracket about its pivotal neutral axis through said torque responsive strip.

3. A semiconductor wind direction and speed sensor as set forth in claim 2 wherein
   said semiconductor strain gages are silicon strain gages.

4. A semiconductor wind direction and speed sensor as set forth in claim 3 wherein
   said means for reacting with said wind consists of circumferentially spaced radially extending raised portions on said cylindrical units.

5. A semiconductor wind direction and speed sensor as set forth in claim 4 wherein
   said cylindrical drag units are each supported on said supporting brackets, one above the other, with the axis of each cylinder drag unit passing through the respective supporting bracket along said diameter of eccentricity at a point between the attachment of the bracket to the cylinder and to the torque responsive strip, said cylindrical drag units in their positions surrounding said standard, torque responsive strip, and supporting bracket having their external surface in face unobstructed air throughout 360°.

6. A semiconductor wind direction and speed sensor as set forth in claim 5 wherein
   said silicon strain gages of each pair are positioned symmetrically at 45° on opposite sides of the neutral axis of said torque responsive strips and at equal distances from the strip ends to equalize torques and thermal effects for both clockwise and counterclockwise moments.

7. A semiconductor wind speed and direction sensor as set forth in claim 6 wherein
   said electric means includes a bridge circuit, a filter, and an amplifier in series with each pair of strain gages to a cathode ray tube display, said cathode ray tube being referenced to a compass heading of said pair of cylindrical drag units to establish wind speed in proportion to the voltage amplitude vector resultant established by the combination of voltage signal amplitudes and to establish wind direction proportional to the relation of the voltage amplitude of one voltage signal with respect to the other voltage signal.

References Cited

UNITED STATES PATENTS

| | | | |
|---|---|---|---|
| 2,985,014 | 5/1961 | Doersam | 73—189 |
| 3,174,336 | 3/1965 | Zrubek | 73—189 |
| 3,381,529 | 5/1968 | Martin | 73—189 |

RICHARD C. QUEISSER, Primary Examiner

C. E. SNEE III, Assistant Examiner

PO-1050
(5/69)

UNITED STATES PATENT OFFICE
CERTIFICATE OF CORRECTION

UNDER RULE 322

Patent No. 3,572,116      Dated March 23, 1971

Inventor(s) JOHN E. PENN

It is certified that error appears in the above-identified patent and that said Letters Patent are hereby corrected as shown below:

Change Patentee's street number to 5241

Column 2, Line 32, change:

"pages G1 and G2"

To read:

gages G1 and G2

Column 5, line 13, change:

"could be converted to ratio signals"

To read:

could be converted to radio signals

Claim 1, column 5, line 66, change:

"positioned with respect to each neutral axis"

To read:

positioned with respect to said neutral axis

Signed and sealed this 2nd day of November 1971.

(SEAL)
Attest:

EDWARD M. FLETCHER, JR.          ROBERT GOTTSCHALK
Attesting Officer                Acting Commissioner of Patent: